US012218466B2

(12) United States Patent
Clyatt, III et al.

(10) Patent No.: US 12,218,466 B2
(45) Date of Patent: Feb. 4, 2025

(54) IMPEDANCE CONTROLLED ELECTRICAL CONTACT

(71) Applicant: SAMTEC, INC., New Albany, IN (US)

(72) Inventors: Clarence L. Clyatt, III, New Albany, IN (US); Travis Ellis, Tigard, OR (US)

(73) Assignee: SAMTEC, INC., New Albany, IN (US)

( * ) Notice: Subject to any disclaimer, the term of this patent is extended or adjusted under 35 U.S.C. 154(b) by 496 days.

(21) Appl. No.: 17/438,222

(22) PCT Filed: Mar. 11, 2020

(86) PCT No.: PCT/US2020/021964
§ 371 (c)(1),
(2) Date: Sep. 10, 2021

(87) PCT Pub. No.: WO2020/185816
PCT Pub. Date: Sep. 17, 2020

(65) Prior Publication Data

US 2022/0181826 A1 Jun. 9, 2022

Related U.S. Application Data

(60) Provisional application No. 62/816,865, filed on Mar. 11, 2019.

(51) Int. Cl.

| | |
|---|---|
| ***H01R 24/44*** | (2011.01) |
| ***H01R 13/24*** | (2006.01) |
| ***H01R 13/631*** | (2006.01) |
| *H01R 12/71* | (2011.01) |

(52) U.S. Cl.
CPC ......... *H01R 24/44* (2013.01); *H01R 13/2421* (2013.01); *H01R 13/6315* (2013.01); *H01R 12/714* (2013.01)

(58) Field of Classification Search
CPC .... H01R 13/6315; H01R 24/44; H01R 24/50; H01R 13/2421; H01R 12/714
USPC .................................................. 439/700, 578
See application file for complete search history.

(56) References Cited

U.S. PATENT DOCUMENTS 4,904,213 A * 2/1990 Hock ................. H01R 13/2421 439/482
5,329,262 A 7/1994 Fisher
5,746,623 A 5/1998 Fuchs et al.
6,758,680 B2 * 7/2004 Duquerroy ............. H01R 24/50 439/63
6,776,668 B1 * 8/2004 Scyoc .................... H01R 24/50 439/700
7,544,093 B2 * 6/2009 Soubh ................ H01R 13/6599 439/581

(Continued)

FOREIGN PATENT DOCUMENTS

CN 106099486 A 11/2016
CN 107863634 A 3/2018

*Primary Examiner* — Marcus E Harcum
(74) *Attorney, Agent, or Firm* — BakerHostetler

(57) ABSTRACT

A radio frequency (RF) electrical contact includes an electrical contact having a stationary electrical contact member and a movable electrical contact member that is received by the stationary electrical contact member. The movable electrical contact member is movable between an initial position and a mated position. The movable electrical contact member can contact the stationary electrical contact member at a stationary or fixed contact location.

30 Claims, 8 Drawing Sheets

(56) References Cited

U.S. PATENT DOCUMENTS

| | | | | |
|---|---|---|---|---|
| 7,749,032 | B1 * | 7/2010 | Yin | H01R 13/2421 439/482 |
| 7,972,173 | B1 * | 7/2011 | Hyzin | H01R 13/6583 439/700 |
| 8,087,956 | B2 * | 1/2012 | Nakayama | G01R 1/045 439/700 |
| 8,337,256 | B1 * | 12/2012 | Lin | H01R 12/7094 439/700 |
| 9,112,323 | B2 * | 8/2015 | Goebel | H01R 4/48 |
| 9,252,468 | B1 * | 2/2016 | Rosas | H01P 5/026 |
| 9,645,172 | B2 * | 5/2017 | Santos | G01R 1/0416 |
| 9,748,680 | B1 * | 8/2017 | Huang | H01R 12/714 |
| 9,837,761 | B1 | 12/2017 | Hardy et al. | |
| 9,960,507 | B1 * | 5/2018 | Flaherty, IV | H01R 12/57 |
| 10,498,061 | B1 * | 12/2019 | Blasick | H01R 24/50 |
| 10,535,942 | B2 * | 1/2020 | Sugiura | H01R 13/17 |
| 10,790,624 | B2 * | 9/2020 | Wang | H01R 24/50 |
| 10,910,778 | B2 * | 2/2021 | Ni | H01R 24/50 |
| 11,316,294 | B2 * | 4/2022 | Flaherty, IV | H01R 24/568 |
| 11,355,881 | B2 * | 6/2022 | Wang | H01R 13/187 |
| 2006/0172561 | A1 * | 8/2006 | Clark | H01R 24/50 439/63 |
| 2008/0180122 | A1 * | 7/2008 | Soubh | G01R 1/06733 324/754.09 |
| 2008/0242120 | A1 * | 10/2008 | Cai | H01R 12/724 439/63 |
| 2008/0258848 | A1 * | 10/2008 | Quan | H03H 7/38 333/260 |
| 2013/0164987 | A1 * | 6/2013 | Mongold | H01R 13/6477 439/626 |
| 2015/0162696 | A1 * | 6/2015 | Morley | H01R 24/44 439/626 |
| 2015/0180182 | A1 * | 6/2015 | Tatzel | H01R 24/40 439/578 |
| 2016/0226203 | A1 | 8/2016 | Bradley et al. | |
| 2020/0091665 | A1 * | 3/2020 | Maki | H01R 12/7082 |

* cited by examiner

IMPEDANCE CONTROLLED ELECTRICAL CONTACT

CROSS-REFERENCE TO RELATED APPLICATIONS

This application is the National Stage Application of International Patent Application No. PCT/US2020/021964, filed Mar. 11, 2020 which claims priority to U.S. Patent Application Ser. No. 62/816,865 filed Mar. 11, 2019, the disclosure of which is hereby incorporated by reference as if set forth in its entirety herein.

BACKGROUND

Electrical connectors include an electrically conductive electrical contact that is configured to be placed in electrical communication with first and second electrical components so as to allow data transfer between the first and second electrical components. A radio frequency (RF) electrical contact has a mounting end that is typically mounted to a coaxial cable, and a mating end that typically mates to a printed circuit board, thereby placing the coaxial cable and the printed circuit board in electrical communication with each other. The RF electrical contact can form a separable interface with the printed circuit board.

Certain types of RF contacts include an outer electrical conductor, an inner electrical conductor, and an electrically insulative spacer disposed between the inner and outer electrical conductors. The inner electrical conductor is configured to mate with the printed circuit board, and further configured to be mounted to the electrical signal conductor of the coaxial cable. The outer electrical conductor is configured to mount to an outer electrical shield or ground of the coaxial cable. In some RF contacts, the inner conductor is movable and spring biased. Accordingly, as the mating end of the inner conductor is placed against the printed circuit board, the spring becomes compressed, thereby applying a biasing force to the inner conductor against the printed circuit board.

However, movement of the inner electrical conductor of conventional RF contacts can cause impedance to vary along the length of the electrical contact. It is therefore desired to provide an electrical RF contact having a movable inner conductor while achieving a substantially constant impedance profile along its length.

SUMMARY

In accordance with one aspect of the present disclosure, an electrical contact can include a stationary electrical contact member, and a movable electrical contact member that is movable with respect to the stationary electrical contact member from an initial position to a mated position. The movable electrical contact member can be in contact with the stationary electrical contact member both in the initial position and the mated position, and at all positions between the initial position and the mated position. The electrical contact can be configured to conduct RF signals within 10 percent of a target impedance both when the movable electrical contact member is in the initial position and when movable electrical contact member is in the mated position.

In another example, the electrical contact can be configured to conduct RF signals up to 72 GHz, including up to 67 GHZ.

DETAILED DESCRIPTION

Figure 1:
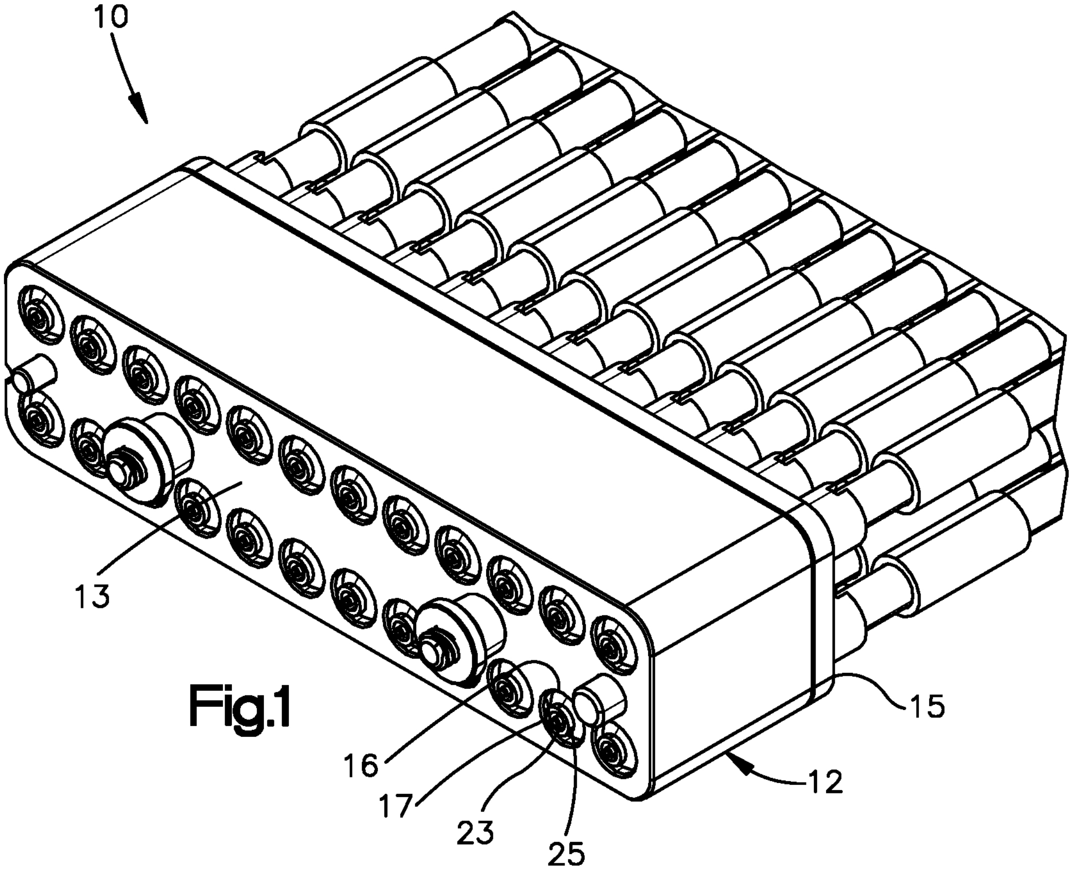
FIG. 1 is a perspective view of an array of RF electrical contacts supported by an array housing.
Figure 2A:
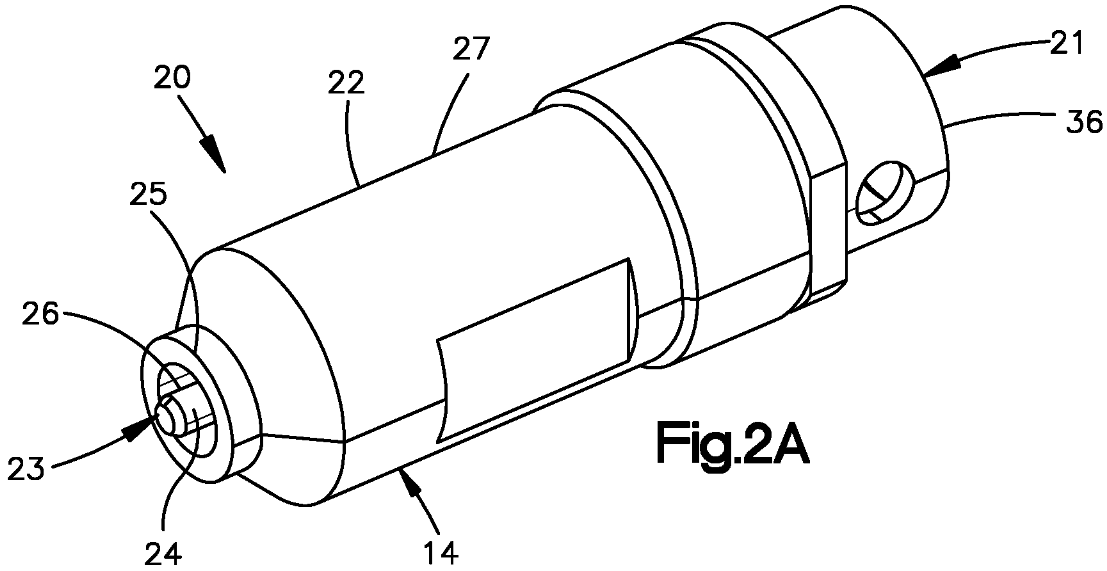
FIG. 2A is a perspective view of an RF electrical contact of the RF electrical contacts of FIG. 1 shown in an initial configuration prior to being mated with a printed circuit board.
Figure 2B:
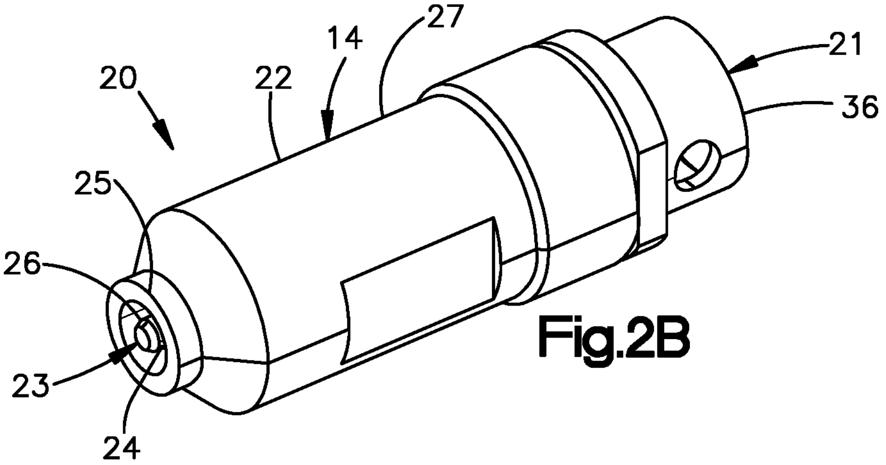
FIG. 2B is a perspective view of the RF electrical contact illustrated in FIG. 2A, but shown in a mated configuration when mated with a printed circuit board.
Figure 2C:
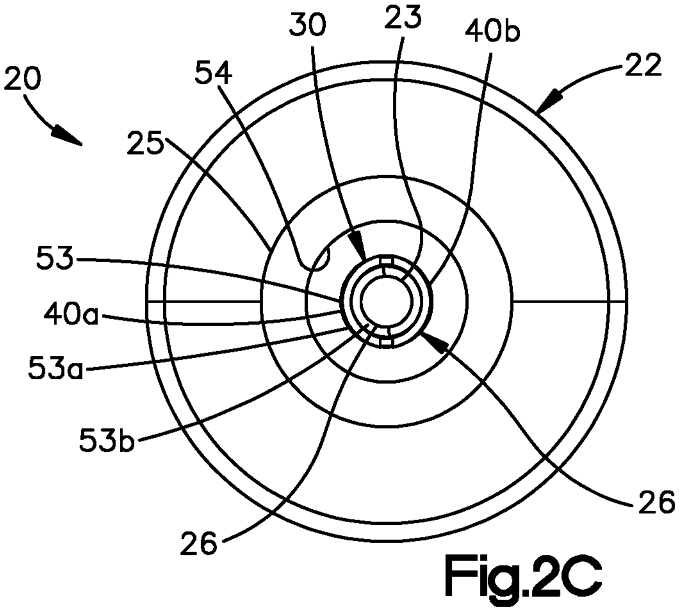
FIG. 2C is a front end elevation view of the RF electrical contact illustrated in FIG. 2A, but constructed in accordance with an alternative embodiment.
Figure 2D:
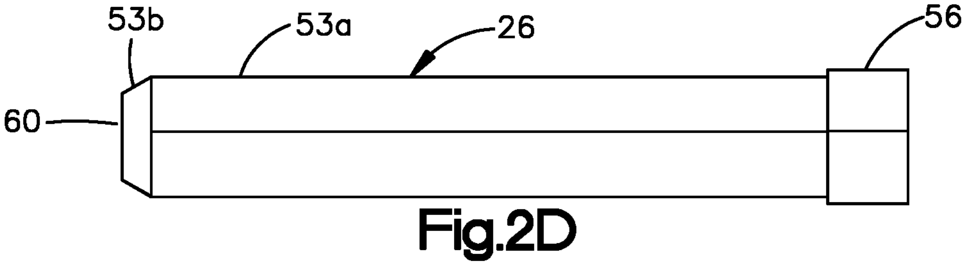
FIG. 2D is a side elevation view of a movable inner contact member illustrated in FIG. 1C.

Referring to FIGS. 1-2D, an array 10 of electrical contacts 20 can include a plurality of electrical contacts 20 and an array housing 12 that supports the electrical contacts 20. In particular, the array housing 12 can support the electrical contacts 20 such that the electrical contacts 20 are aligned with each other along one or more columns and one or more rows that are substantially perpendicular to the one or more columns. That is, respective central axes 31 (see FIG. 3A) of the electrical contacts 20 can be aligned with each other along one or more columns and one or more rows. The array housing 12 defines a front end 13 and a rear end 15 opposite the front end 13 along a longitudinal direction that is perpendicular to each of the columns and rows. The front end 13 is spaced from the rear end 15 in a forward direction. Conversely, the rear end 15 is spaced from the front end 13 in a rearward direction opposite the forward direction.

Each of the electrical contacts 20 can include a signal contact member that defines a first or signal mating end 23, and a ground contact member 14 that defines a second or ground mating end 25. In particular, each of the electrical contacts can include an outer housing 22 that defines the ground contact member 14. The outer housing 22 includes an outer housing body 27, and the ground mating end 25 projects out from outer housing body 27. The signal mating end 23 and the ground mating end 25 can each project out from the front end 13 in the forward direction. In particular, the array housing 12 defines an aperture 16 that extends through the front end 13. The signal mating end 23 and the ground mating end 25 extend through the aperture 16 in the forward direction. Further, the front end 13 defines an internal surface 17 that defines the aperture 16.

The internal surface 17 can at least partially surround the ground mating end 25. For instance, the internal surface 17 can entirely surround the ground mating end 25. That is, the internal surface 17 can extend continuously and uninterrupted about an entirety of the ground contact member 14, and in particular the ground mating end 25, in a plane that is oriented perpendicular to the central axis 31 (see FIG. 3A). For example, the internal surface 17 can define a complete substantial circle in the plane. It should be appreciated, however, that the internal surface 17 can define any suitable alternative shape in the plane as desired.

Referring to FIGS. 2A-2B, a radio frequency (RF) electrical contact 20 can include an outer housing 22 and an inner electrical contact 24. The outer housing 22 can be electrically conductive and can define the ground contact member 14. The inner electrical contact 24 can be electrically conductive and supported at least partially in the outer housing 22. The inner electrical contact 24 can define the signal contact member. In one example, the outer housing 22 can be made from any suitable electrically conductive material such as metal. For instance, the outer housing 22 can be brass. The inner electrical contact 24 can be electrically insulated from the electrically conductive housing 22 with respect to electrical conduction. The electrical contact 20 can define a mounting end 21 that is configured to be mounted to an electrical cable, such as a coaxial cable. Further, the electrical contact 20 can define a signal mating end 23 that is configured to mate with a printed circuit board, thereby placing the RF electrical contact 20 in electrical communication with the printed circuit board.

Figure 3A:
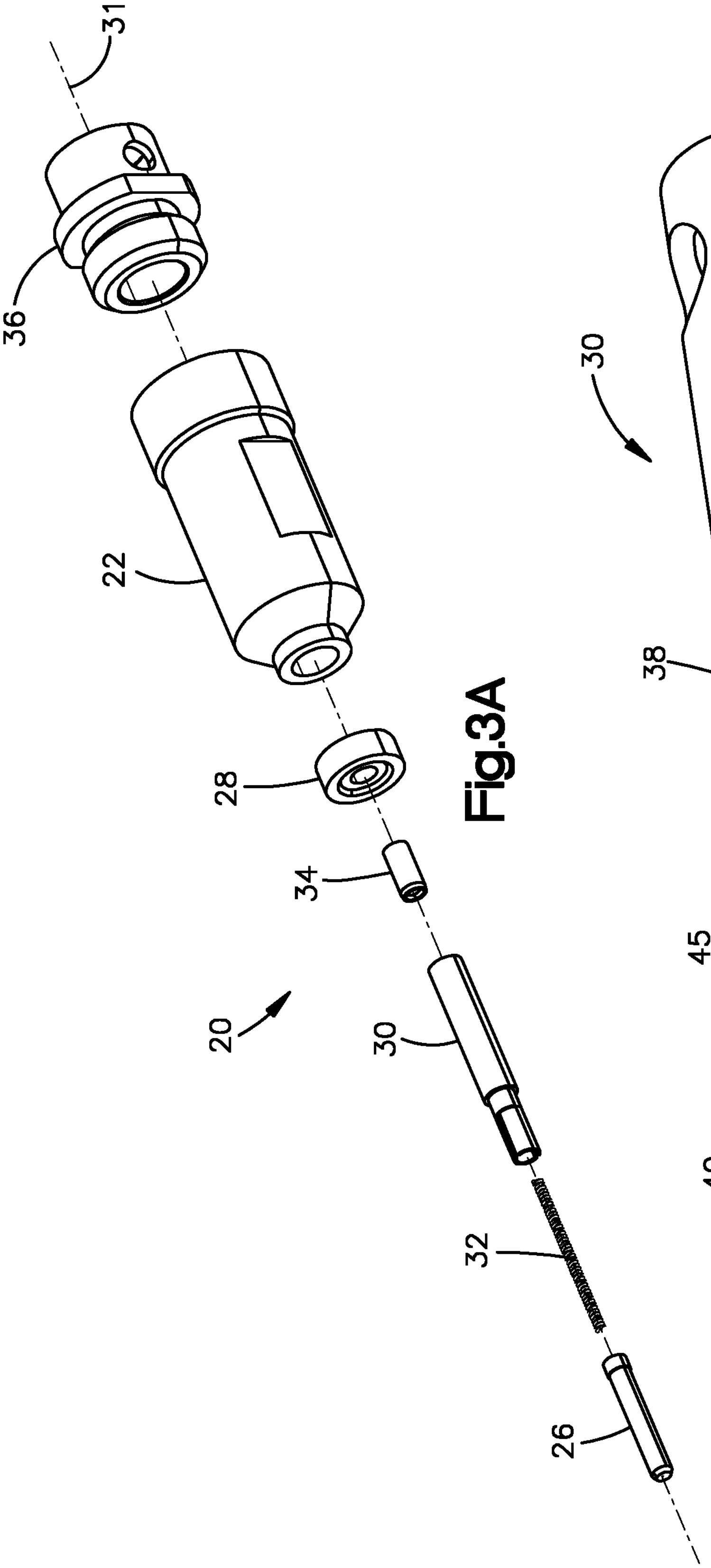
FIG. 3A is an exploded perspective view of the RF electrical contact illustrated in FIG. 2A, shown including a movable inner contact member, a stationary inner contact member, a spring, a spring seat, an electrically insulative spacer, an electrically conductive housing, and a ferrule.

In particular, the signal contact member of the electrical contact 20 includes a movable contact member 26 and a stationary contact member 30 (see FIG. 3A). The movable and stationary inner contact members 26 and 30 can be referred to as a movable inner contact member 26 and a stationary inner contact member 30, respectively, because the movable and stationary contact members 26 and 30 are disposed inward with respect to the outer housing 22. The movable inner contact member 26 and the stationary inner contact member 30 can combine to define a transmission path from the mounting end 21 to the mating end 23, as described in more detail below. Thus, when the RF electrical contact 20 is mated with the printed circuit board and mounted to the electrical cable, the electrical cable and the printed circuit board are placed in electrical communication with each other through the RF electrical contact 20. The movable inner contact member 26 can define the first or signal mating end 23 in one example.

The electrical contact 20 can define a forward direction from the mounting end 21 to the mating end 23. Similarly, the electrical contact can define a rearward direction that is opposite the forward direction. The rearward direction can extend from the mating end 23 to the mounting end 21. Thus, terms such as "forward," "front," and words of similar import as used herein are intended to refer to the forward direction. Similarly, terms such as "rearward," "rear," and words of similar import as used herein are intended to refer to the rearward direction.

The electrical contact 20 can include an electrically conductive movable inner contact member 26 that is movable between a first or initial position of the inner electrical contact 24 illustrated in FIG. 2A and a second or mated position of the inner electrical contact 24 as illustrated in FIG. 2B. The movable inner contact member 26 can be rearwardly recessed in the mated position with respect to the initial position. When the RF electrical contact 20 is mated to the printed circuit board, a mating force causes the movable inner contact member to move from the initial position to the mated position. The electrical contact 20 can be said to have a first or initial configuration when the movable inner contact member 26 is in the initial position. The electrical contact 20 can be said to have a second or mated configuration when the movable inner contact member is in the mated position.

As will be appreciated from the description below, the electrical contact 20 can have a first single-ended impedance in the initial configuration, and a second single-ended impedance in the mated configuration. The first and second single-ended impedances can be substantially equal to each other. For instance, the first and second single-ended impedances can be sufficiently equal to each other so as to allow the electrical contact 20 to transmit RF signals along the inner electrical contact 24 between the coaxial cable and the printed circuit board at a target operating frequency that can be up to and including approximately 72 GHz, such as approximately 67 GHz.

In one example, the second single-ended impedance can be plus or minus 10% of the first single-ended impedance. For instance, the first single-ended impedance can be approximately 50Ω (ohms). Thus, the second single-ended impedance can be in a range from approximately 45Ω to approximately 55Ω, including approximately 50Ω, when the first single-ended impedance is approximately 50Ω. Accordingly, the second single-ended impedance can be within 5Ω of the first single-ended impedance.

In another example, the second single-ended impedance can be plus or minus 8% of the first single-ended impedance. Thus, the second single-ended impedance can be in a range from approximately 46Ω to approximately 54Ω including approximately 50Ω, when the first single-ended impedance is approximately 50Ω. Accordingly, the second single-ended impedance can be within 4Ω of the first single-ended impedance.

In another example, the second single-ended impedance can be plus or minus 6% of the first single-ended impedance. Thus, the second single-ended impedance can be in a range from approximately 47Ω to approximately 53Ω, including approximately 50Ω, when the first single-ended impedance is approximately 50Ω. Accordingly, the second single-ended impedance can be within 3Ω of the first single-ended impedance.

In another example, the second single-ended impedance can be plus or minus 5% of the first single-ended impedance. Thus, the second single-ended impedance can be in a range from approximately 47.5Ω to approximately 52.5Ω, including approximately 50Ω, when the first single-ended impedance is approximately 50Ω. Accordingly, the second single-ended impedance can be within 2.5Ω of the first single-ended impedance.

In another example, the second single-ended impedance can be plus or minus 4% of the first single-ended impedance. Thus, the second single-ended impedance can be in a range from approximately 48Ω to approximately 52Ω, including approximately 50Ω, when the first single-ended impedance is approximately 50Ω. Accordingly, the second single-ended impedance can be within 2Ω of the first single-ended impedance.

In another example, the second single-ended impedance can be plus or minus 3% of the first single-ended impedance. Thus, the second single-ended impedance can be in a range from approximately 48.5Ω to approximately 51.5Ω, including approximately 50Ω, when the first single-ended impedance is approximately 50Ω. Accordingly, the second single-ended impedance can be within 1.5Ω of the first single-ended impedance.

In another example, the second single-ended impedance can be plus or minus 2% of the first single-ended impedance. Thus, the second single-ended impedance can be in a range from approximately 49Ω to approximately 51Ω, including approximately 50Ω, when the first single-ended impedance is approximately 50Ω. Accordingly, the second single-ended impedance can be within 1Ω of the first single-ended impedance.

In another example, the second single-ended impedance can be plus or minus 1% of the first single-ended impedance. Thus, the second single-ended impedance can be in a range from approximately 49.5Ω to approximately 50.5Ω, including approximately 50Ω, when the first single-ended impedance is approximately 50Ω. Accordingly, the second single-ended impedance can be within 0.5Ω of the first single-ended impedance.

In this regard, it should be recognized that when the first single-ended impedance is approximately 50Ω, the second single-ended impedance can be in a range from approximately 45Ω to approximately 55Ω, including approximately 46Ω, approximately 47Ω, approximately 48Ω, approximately 49Ω, approximately 50Ω, approximately 51Ω, approximately 52Ω, approximately 53Ω, approximately 54Ω, approximately and 55Ω.

As used herein, the terms "substantially," "approximately," "about," derivatives thereof, and words of similar import as used herein recognizes that referenced dimensions, sizes, shapes, directions, or other parameters can include the stated dimensions, sizes, shapes, directions, values, or other parameters as well as up to ±10%, including ±8%, ±6%, ±5%, ±4%, ±3%, ±2%, and ±1% of the stated dimensions, sizes, shapes, directions, values, or other parameters. Further, the term "at least one" stated structure as used herein can refer to either or both of a single one of the stated structure and a plurality of the stated structure. Additionally, reference herein to a singular "a," "an," or "the" applies with equal force and effect to a plurality unless otherwise indicated. Similarly, reference to a plurality herein applies with equal force and effect to the singular "a," "an," or "the."

Further, the electrical contact 20 can be configured to operate at a target impedance. The first single-ended impedance and the second single-ended impedance can be within plus or minus 10% of the target impedance, it being recognized that the actual first and second single-ended impedances can vary due to factors such as manufacturing tolerances. In some examples, the first and second single-ended impedances can be within plus or minus 5% of the target impedance. For instance, the first and second single-ended impedances can be within plus or minus 4% of the target impedance, such as 3% of the target impedance, and in particular 2% of the target impedance, and in one specific example within 1% of the target impedance. In one example, the target impedance can be approximately 50Ω. In other examples, the target impedance can be approximately 40Ω. In still other examples, the target impedance can be approximately 60Ω. Thus, the target impedance can range from approximately 40Ω to approximately 60Ω, including approximately 41Ω, approximately 42Ω, approximately 43Ω, approximately 44Ω, approximately 45Ω, approximately 46Ω, approximately 47Ω, approximately 48Ω, approximately 49Ω, approximately 50Ω, approximately 51Ω, approximately 52Ω, approximately 53Ω, approximately 54Ω, approximately 55Ω, approximately 56Ω, approximately 57Ω, approximately 58Ω, and approximately 59Ω. It should be appreciated, of course, that the target impedance can be any suitable impedance as desired, such as approximately 1Ω to 100Ω, or any other impedance. The first and second impedance values can be plus or minus 5Ω of the target impedance. In some examples, the first and second impedance values can be plus or minus 1Ω of the target impedance.

Referring now to FIG. 3A, the RF electrical contact 20 can include the outer housing 22, and the inner electrical contact 24 that includes the movable inner contact member 26 and the stationary inner contact member 30. The inner electrical contact 24 can extend along a central axis 31. The RF electrical contact 20 can further include an electrically insulative spacer 28 that is configured to electrically insulate the inner electrical contact 24 from the outer housing 22. The RF electrical contact 20 can further include a spring 32 and a spring seat 34 arranged such that the spring 32 is configured to apply a forward biasing force against the movable inner contact member 26 that biases the movable inner contact member 26 toward the initial position. The electrical contact 20 can further include a ferrule 36 that is configured to receive an electrical cable so as to mount the electrical cable to the electrical contact 20. The electrical cable can be configured as a coaxial cable. One or more up to all of the outer housing 22, the movable inner contact member 26, the stationary inner contact member 30, the electrically insulative spacer 28, the spring 32, the spring seat 34, and the ferule 36 can have respective central axes that are defined by the central axis 31.

The terms "outward" and "inward" and words of similar import as used herein are intended to refer to the central axis 31. For instance, terms such as "outward," "outer," and words of similar import are intended to refer to a direction radially out from the central axis. Similarly, terms such as "inward," "inner," and words of similar import are intended to refer to a direction radially toward the central axis. It is recognized that certain components can be cylindrical or otherwise round in shape. Thus, the central axis 31 can be said to be oriented along an axial direction, which can also be referred to as a longitudinal direction. Directions perpendicular to the central axis 31 can be referred to as radial directions. However, it is also recognized that perpendicular directions that extend perpendicular to the central axis 31 can be referred to as a lateral direction and a transverse direction that are perpendicular to each other. For instance, the rows of electrical contacts 20 shown in FIGS. 1A-1B can be arranged along the lateral direction, and the columns of electrical contacts 20 shown in FIGS. 1A-1B can be arranged along the transverse direction. Similarly, reference herein to one or both of the lateral direction and the transverse direction can be referred to as the radial direction in some examples. In this regard, it is recognized that the components of the electrical contact 20 need not be cylindrical or round, and that all suitable alternative geometric shapes and configurations are contemplated herein. Thus, terms such as "circumferential" and words of similar import is intended to refer to a direction that surrounds the central axis 31. In some examples, a circumferential direction can be a circular direction. It should be appreciated that the term "circumferential" as used herein can refer to any shape that extends about or at least partially about the central axis in a plane that is oriented perpendicular to the central axis.

Figure 3B:
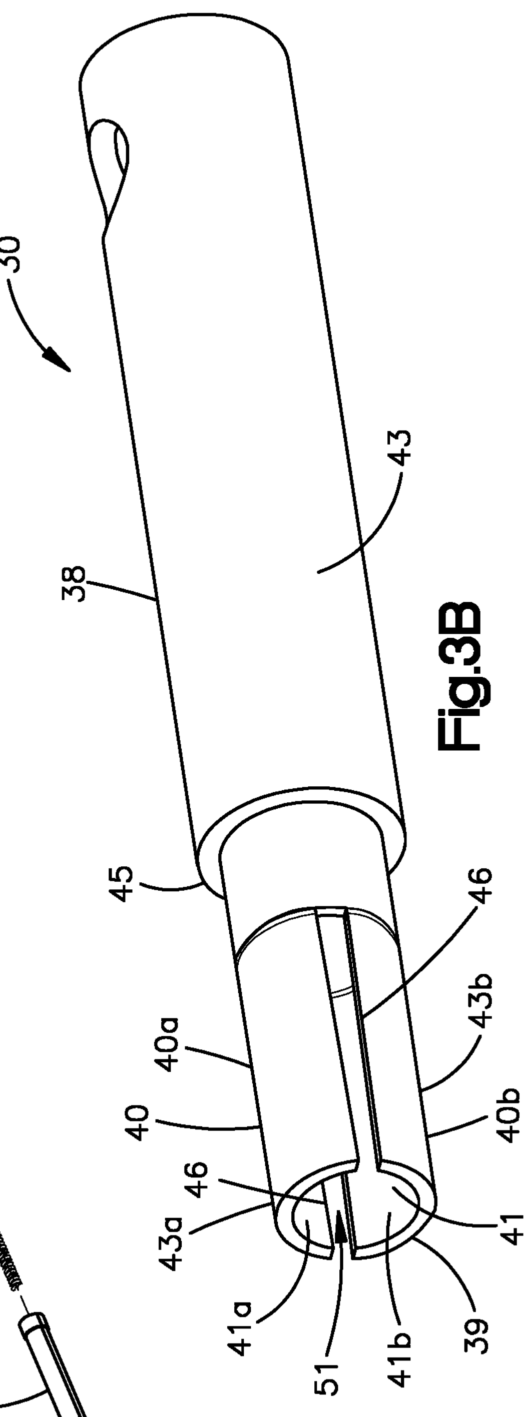
FIG. 3B is a perspective view of the stationary inner contact member illustrated in FIG. 3A.

Referring now also to FIG. 3B, the stationary inner contact member 30 can include a base portion 38 and at least one contact arm 40 that extends out from the base portion 38 and terminates at a distal end 39 of the stationary inner contact member 30. The contact arm 40 is configured to contact the movable inner contact member 26 as the inner contact member 26 moves with respect to the stationary contact member 30 between the insertion position and the mated position, thereby establishing an electrical connection between the movable inner contact member 26 and the stationary inner contact member 30. In one example, the movable inner contact member 26 can be received in the stationary inner contact member 30 as the movable inner contact member 26 moves from the initial position to the mated position.

The at least one contact arm 40 can extend forward from the base portion 38 to the distal end 39. The distal end 39 can be a free distal end. Thus, the at least one arm 40 can be said to be cantilevered from the base portion 38. The stationary inner contact member 30 can define a radially inner surface 41 and a radially outer surface 43 opposite the radially inner surface 41. The at least one arm 40 can be configured to contact the movable inner contact member 26 at the radially inner surface 41. The at least one contact arm 40 can define an inner cross-sectional dimension at the at least one radially inner surface 41. Further, the stationary inner contact member 30 can define an inner channel 51 that is defined by the radially inner surface 41. The inner channel 51 can extend at least into the stationary inner contact member 30 rearwardly from the distal end 39. The inner channel 51 can terminate longitudinally in the stationary inner contact member 30. Alternatively, the inner channel 51 can extend entirely through the stationary inner contact member 30 along the longitudinal direction.

The at least one contact arm 40 can further define an outer cross-sectional dimension at the at least one radially outer surface 43. The at least one contact arm 40 can extend along a circular path in a plane that is oriented perpendicular to the central axis 31. Thus, the inner and outer cross-sectional dimensions can be diameters, though it should be appreciated that the at least one contact arm 40 can be alternatively shaped as desired. In some examples, the inner and outer cross-sectional dimensions can intersect the central axis 31.

At least a portion of the at least one radially inner surface 41 up to an entirety of the at least one radially inner surface 41 can taper radially inwardly toward the central axis 31 of the inner electrical contact 24 as it extends in the forward direction along the at least one arm 40 to the distal end 39. The at least one radially outer surface 43 can extend parallel to the at least one radially inner surface 41 in some examples. Thus, at least a portion of the at least one radially outer surface 43 up to an entirety of the at least one radially outer surface 43 can similarly taper radially inward as it extends forward along the at least one arm with respect to the base portion 38. The base portion 38 can define a shoulder 45 having an outer cross-sectional dimension greater than the outer cross-sectional dimension of the at least one arm 40. The shoulder 45 can extend along a circular path in a plane that is oriented perpendicular to the central axis 31. Thus, the outer cross-sectional dimension of the shoulder 45 can be a diameter, though it should be appreciated that the shoulder 45 can be alternatively shaped as desired. In some examples, the outer cross-sectional dimension of the shoulder 45 can intersect the central axis 31.

In one example, the at least one arm 40 can include first and second contact arms 40*a* and 40*b* that extend out from the base portion 38. The stationary inner contact member 30 can define at least one slot 46 that separates the first and second arms 40*a* and 40*b* from each other. For instance, the at least one slot 46 can extend through the stationary inner contact member 30, and can have a circumferential width so as to separate the first and second arms 40*a* and 40*b* from each other. In one example, the stationary inner contact member 30 can define first and second slots 46.

The first and second slots 46 can be disposed radially opposite each other. Further, the first and second slots 46 can have the same circumferential width that separates the first and second contact arms 40*a* and 40*b* from each other. The width of each of the slots 46 can taper circumferentially as the slots extend in the forward direction. The first and second arms 40*a* and 40*b* can be disposed radially opposite each other. Further, the first and second arms 40*a* and 40*b* can have the approximately the same size and shape. For instance, the first and second arms 40*a* and 40*b* can have the same circumferential width. Further, the first and second arms 40*a* and 40*b* can have the same longitudinal length. It should be appreciated, of course, that the first and second slots can be disposed at any suitable location as desired, and can have any suitable size and shape as desired. The first and second slots 46 can extend forward from the base portion 38 through the distal end 39. Thus, a respective entirety of the first arm 40*a* can be circumferentially spaced from a respective entirety of the second arm 40*b*.

As will be appreciated from the description below, the first and second arms 40*a* and 40*b* can be resiliently supported by the base portion 38. Thus, when the first and second arms 40*a* and 40*b* are elastically deflected outward, the first and second arms 40*a* and 40*b* can be inwardly biased. The first and second arms 40*a* and 40*b* can define respective first and second inner surface portions 41*a* and 41*b* of the inner surface 41 of the stationary inner contact member 30. One or both of the first and second radially inner surface portions 41*a* and 41*b* can be configured to contact the movable inner contact member 26 as the inner contact member 26 moves between the insertion position and the mated position, thereby establishing an electrical connection between the movable inner contact member 26 and the stationary inner contact member 30, including each of the contact arms 40*a* and 40*b*.

Figure 3C:
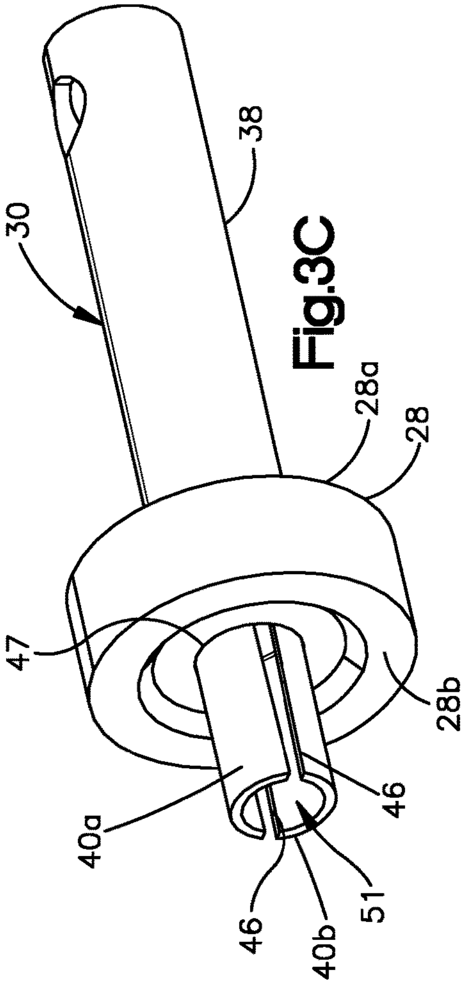
FIG. 3C is a perspective view of the electrically insulative spacer coupled to the stationary inner contact member illustrated in FIG. 3A.

Referring now to FIG. 3C, and as described above, the electrically insulative spacer 28 can be disposed between the inner electrical contact 24 and the outer housing 22. The spacer 28 can thus maintain a radial gap between the inner electrical contact 24 and the outer housing 22, maintaining electrical isolation between the inner electrical contact 24 and the outer housing 22. In one example, the electrically insulative spacer 24 can be mounted to the stationary inner contact member 30. For instance, the electrically insulative spacer 24 can be mounted onto the at least one radially outer surface 43 of the at least one contact arm 40. In particular, the at least one contact arm 40 can be received by an opening 47 that extends longitudinally through the electrically insulative spacer 28. For instance, the first and second arms 40*a* and 40*b* can define respective first and second outer surface portions 43*a* and 43*b* of the outer surface 43 of the stationary inner contact member 30. The electrically insulative spacer 28 can be mounted to the first and second outer surface portions 43*a* and 43*b*.

In one example, the electrically insulative spacer 28 can at least partially surround a portion of the at least one contact arm 40. For instance, the electrically insulative spacer 28 can at least partially surround each of the first and second contact arms 40*a* and 40*b*. In one example, the electrically insulative spacer 28 can extend from a first or rear end 28*a* to a second or front end 28*b*. The rear end 28*a* can abut the shoulder 45 or can be positioned adjacent the shoulder 45. The front end 28*b* can be radially aligned with the first and second contact arms 40*a* and 40*b*. Further, the front end 28*b* can be spaced from the distal end 39 in the rearward direction. Respective front ends of the first and second contact arms 40*a* and 40*b* can extend forward from the electrically insulative spacer 28 to the distal end 39. The spacer 28 can be made of any suitable material as desired. For instance, the spacer 28 can be a Teflon spacer in one example.

Figure 4A:
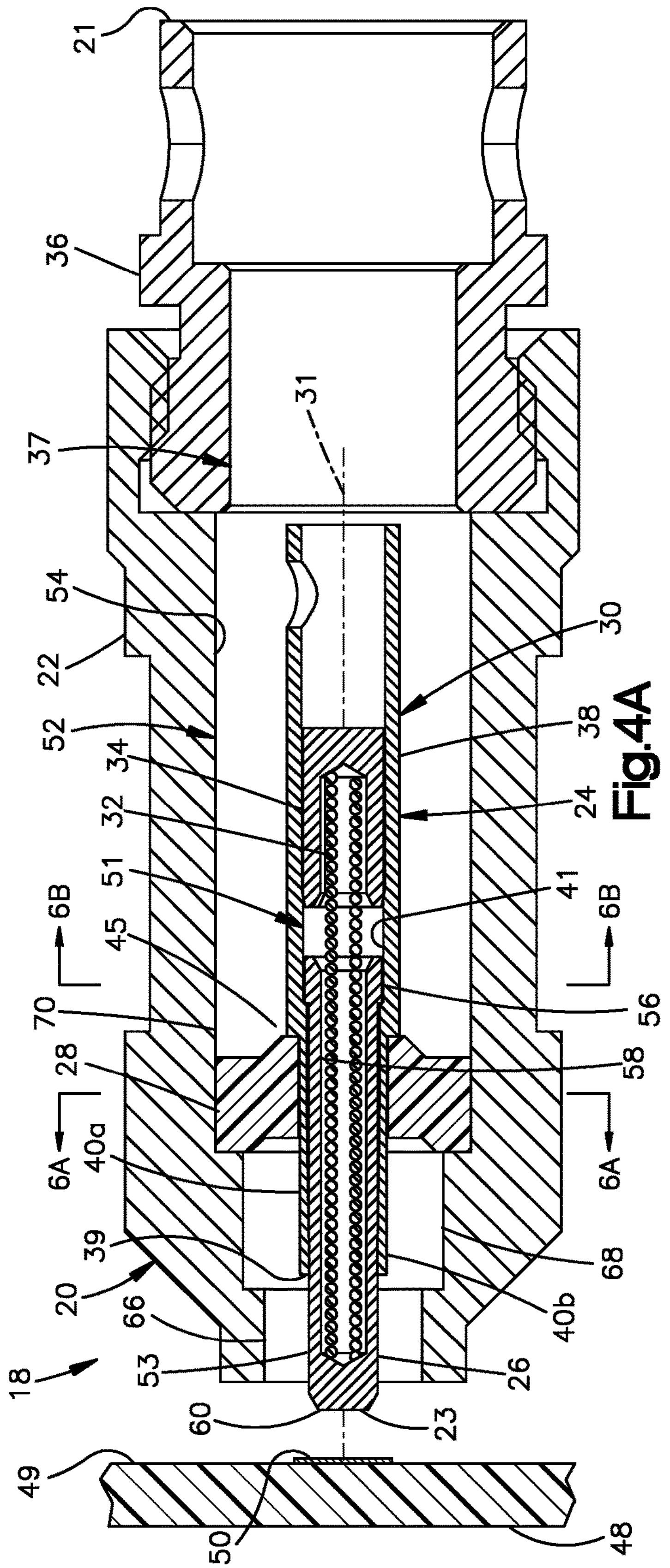
FIG. 4A is a sectional side elevation view of the RF electrical contact illustrated in FIG. 3A, shown in the initial configuration and aligned to be mated with a printed circuit board.

Referring now to FIG. 4A, an electrical communication assembly 18 can include the electrical contact 20 and the underlying substrate 48. In one example, the electrical contact 20 can be an RF electrical contact of the type described herein, such that the electrical communication assembly 18 can be an RF communication assembly. In FIG. 4A, the RF electrical contact 20 is shown in the initial configuration aligned to be mated to an underlying substrate 48. The substrate 48 can be configured as a printed circuit board in one example. The substrate 48 can define an outer surface 49 and an electrical contact pad 50 at the outer surface 49. The movable inner contact member 26 can be configured to contact the electrical contact pad 50 so as to establish an electrical connection between the RF electrical contact and the substrate 48. The electrical contact 20 can be moved in the forward direction so as to mate the electrical contact with the substrate 48. Thus, the forward direction can also be referred to as a mating direction. In some examples, the front end 13 of the array housing 12 (see FIG. 1) can abut the outer surface 49 of the substrate 48 when the electrical contact 20 is mated to the substrate 48. Alternatively, the front end 13 of the array housing 12 can be spaced from the outer surface 49 of the substrate 48 when the electrical contact 20 is mated to the substrate 48.

Figure 4B:
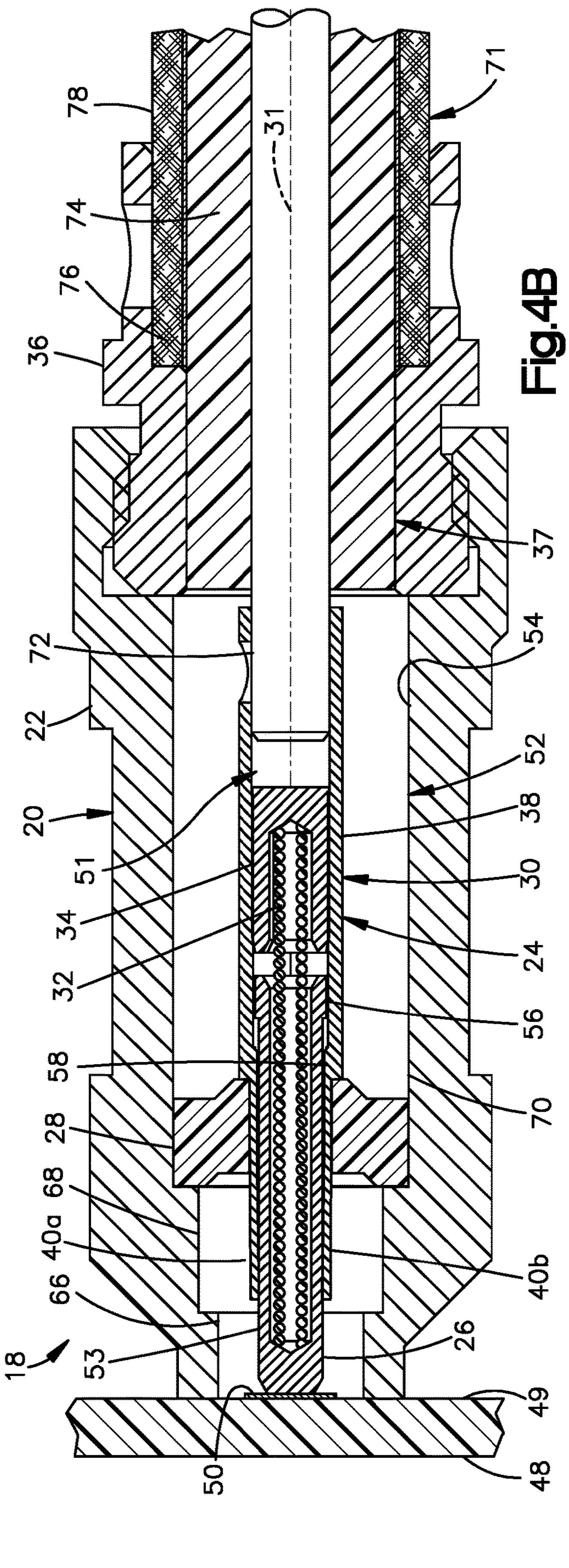
FIG. 4B is an enlarged sectional side elevation view of the RF electrical contact illustrated in FIG. 4A, shown mated with the printed circuit board and mounted to an electrical cable.

Referring to FIG. 4B, the ferrule 36 can be coupled to the outer housing 22. In particular, the ferrule 36 can be coupled to the rear end of the outer housing 22. The ferrule 36 can define a ferrule channel 37 that extends through the ferrule 36 along the longitudinal direction. The ferrule 36 can be coupled to the rear end of the outer housing 22, such that the ferrule channel 37 is aligned with the inner channel 51 of the stationary inner contact member 30. For instance, the ferrule 36 can be threadedly coupled to the outer housing 22. Alternatively, the ferrule 36 can be defined by the outer housing 22.

The RF communication assembly 18 can further include an electrical cable 71. The RF electrical contact 20 is configured to be mounted to the electrical cable 71. Thus, when the RF electrical contact 20 is mated to the substrate 48 and mounted to the electrical cable, the substrate 48 and the electrical cable 71 are placed in electrical communication with each other through the RF electrical contact 20. The electrical cable 71 can be configured as a coaxial cable. Thus, the electrical cable 71 can include an RF signal conductor 72, an electrical insulator 74 that surrounds the RF signal conductor, an electrical shield 76 that surrounds the electrical insulator 74, and an outer electrically insulative jacket 78 that surrounds the electrical shield 76.

The electrical cable 71 can be received in the ferrule channel 37 of the ferrule 36. The electrical or RF signal conductor 72 can couple to the inner electrical contact 24, thereby placing the RF signal conductor 72 in electrical communication with the stationary inner contact member 26 with respect to electrical conduction. Thus, during operation, RF signals can travel along the movable inner contact member 26 and the stationary inner contact member 30 between the substrate 48 and the RF signal conductor 72 of the electrical cable 71. In one example, the RF signal conductor 72 can couple to the stationary inner contact member 30 in any suitable manner as desired. For instance, the RF signal conductor 72 can extend into the inner channel 51 of the stationary inner contact member 30 in the forward direction. Thus, the RF signal conductor 72 is placed in electrical communication with the stationary inner contact member 30 with respect to electrical conduction. The RF signal conductor 72 can be soldered or otherwise secured to the stationary inner contact member 30.

The electrical shield 76 can be coupled to the outer housing 22, thereby placing the electrical shield 76 in electrical communication with the outer housing 22 with respect to electrical conduction. In this regard, the outer housing 22 can be configured as an outer electrical contact. The outer housing 22 can be mated with an electrical ground contact pad of the substrate 48. In particular, the ground mating end 25 is configured to be brought against the electrical ground contact pad when the inner contact. The ground mating end 25 projects out from the front end of the outer housing 22. In particular, the ground mating end 25 can project out from the front end of the outer housing 22 in the forward direction.

Referring also to FIG. 1, the ground mating end 25 at least partially surrounds the signal mating end 23. In particular, the ground mating end 25 at least partially surrounds the signal mating end 23 in a plane that is oriented perpendicular to the central axis 31. For instance, the ground mating end 25 can entirely surround the signal mating end 23. That is, the ground mating end 25 can extend continuously and uninterrupted about an entirety of the signal mating end 23 in the plane that is oriented perpendicular to the central axis 31. For example, the ground mating end 25 can be circular in the plane. It should be appreciated, however, that the ground mating end 25 can define any suitable alternative shape in the plane as desired.

Figure 7:
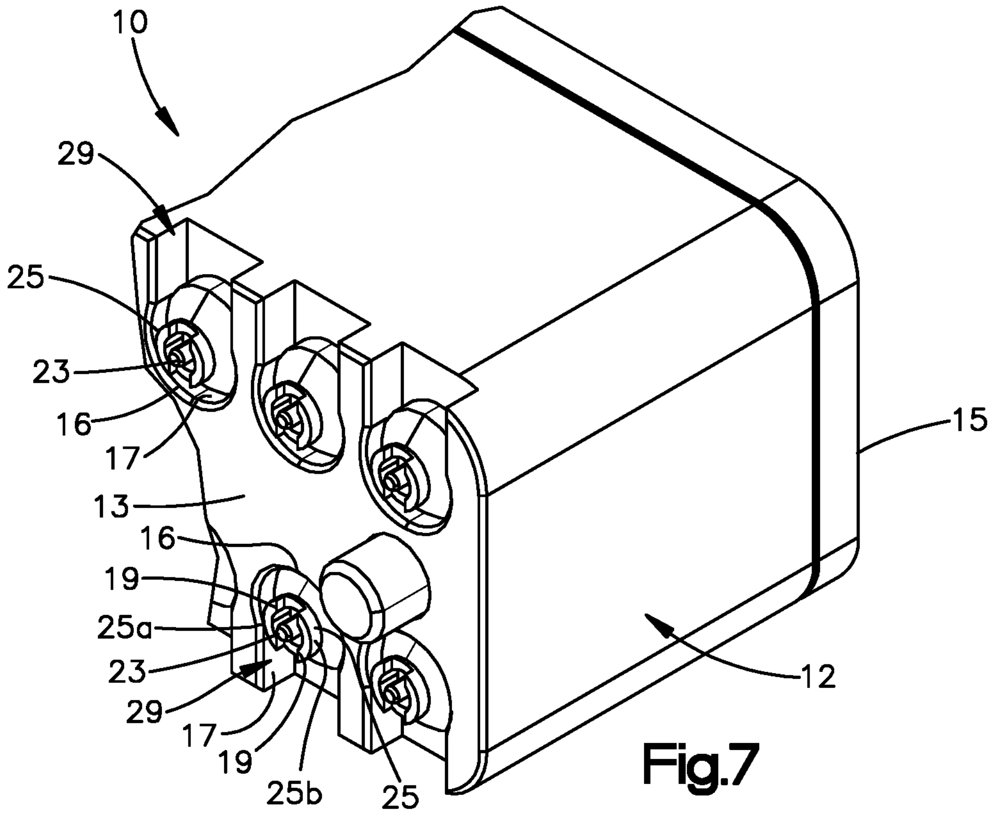
FIG. 7 is a perspective view of a portion of an array of electrical contacts similar to FIG. 1A, but shown in accordance with another example.

Alternatively, referring now to FIG. 7, the ground mating end 25 can partially surround the signal mating end 23. In particular, the ground mating end 25 can partially surround the signal mating end 23 in a plane that is oriented perpendicular to the central axis 31. Thus, the ground mating end 25 can surround a portion of the signal mating end 23. In one example, the ground contact member 14 can define at least one recess 19 that extends radially through the ground mating end 25 in the plane. Thus, the ground mating end 25 can be discontinuous as it extends about the signal mating end 23 in the plane. In one example, the ground mating end 25 can define at least two segments 25*a* and 25*b* in the plane.

The ground mating end 25 can define respective recesses 19 that are disposed between the segments 25*a* and 25*b* in the plane. The recesses 19 between the first and second segments 25*a* and 25*b* can be disposed opposite each other along the transverse direction in one example. Further, the recesses 19 can be substantially identically sized and shaped. Alternatively, the recess can be arranged as otherwise desired. It should be appreciated of course that the ground mating end 25 can define any number of segments as desired. Further, the segments can be arc-shaped or alternatively shaped as desired. In one example, the first and second segments 25*a* and 25*b* can be oriented along a common circular path.

Referring now to FIG. 7, the internal surface 17 can surround a portion less than an entirety of the ground mating end 25 in a plane that is oriented perpendicular to the central axis 31. In particular, the internal surface 17 can define a channel 29 that extends into the front end 13 along the rearward direction, and further extends from the aperture 16 toward an outer perimeter of the front end 13. For instance, the channel 29 can extend from the aperture 16 to the outer perimeter of the front end 13. For instance, the channels 29 of the array housing 12 can extend from an uppermost row of apertures 16 to an upper perimeter of the front end 13, and the channels 29 of the array housing 12 can extend from a lowermost row of apertures 16 to a lower perimeter of the front end 13. The apertures 16 of the uppermost row can partially surround the ground mating ends 25 of a corresponding uppermost row of the electrical contacts 20. Similarly, the apertures 16 of the lowermost row can partially surround the ground mating ends 25 of a corresponding lowermost row of the electrical contacts 20. It is thus appreciated that the channel 29 can disrupt the internal surface 17 as it extends about the ground mating end 25. Otherwise stated, the internal surface 17 can be discontinuous as it extends about the ground mating end 25. The channel 29 can extend along the transverse direction in one example.

Referring again to FIG. 4B, and as described above, the movable inner contact member 26 can be movable with respect to the stationary inner contact member 30 between the initial position and the mated position. The outer housing 22 can define a channel 52 that is elongate along the longitudinal direction. In particular, the outer housing 22 can define a radially inner surface 54 that defines the channel 52. The channel 52 can extend along the central axis 31. In one example, the central axis 31 can define a central axis of the channel 52.

The stationary inner contact member 30 can be disposed in the channel 52. In one example, the electrically insulative spacer 28 can extend from the outer surface portions 43*a* and 43*b* of the arms 41*a* and 41*b* to the radially inner surface 54 of the outer housing 22. Thus, the stationary inner contact member 30 can be supported by the electrically insulative spacer 28 such that no portion of the inner contact member 30 is in contact with the electrically conductive outer housing 22.

At least a portion of the movable inner contact member 26 can be disposed in the channel 52. In particular, at least a portion of the movable inner contact member 26 can be supported in the inner channel 51 of the stationary inner contact member 30. The movable inner contact member 26, and in particular the signal mating end 23, can have an outer surface 53 that defines an outer cross-sectional dimension of the inner contact member 26. The outer cross-sectional dimension of the movable inner contact member 26 can be sized greater than the inner cross-sectional dimension of at least a portion of the stationary inner contact member 30, and in particular of the at least one arm 41. For instance, the outer cross-sectional dimension of the movable inner contact member 26 can be sized greater than the inner cross-sectional dimension defined by the first and second inner surface portions 41*a* and 41*b* at least at a stationary or fixed contact location of the at least one arm 40. The stationary or fixed contact location does not move along the longitudinal direction as the movable inner contact member 26 moves between the initial position and the mated position.

In one example, the outer cross-sectional dimension defined by the outer surface 53 of the movable inner contact member 26 can be sized greater than the inner cross-sectional dimension defined by the first and second inner surface portions 41*a* and 41*b* only at the stationary contact location. The stationary contact location can be defined by the distal end 39 of the arms 40*a* and 40*b*. Thus, the movable inner contact member 26 can contact the stationary inner contact member 30 only at the stationary contact location. In particular, the outer surface 53 of the movable inner contact member 26 can contact the inner surface 41 of the stationary inner contact member 30 at the stationary contact location. The movable inner contact member 26 can be spaced from all other locations of the stationary inner contact member 30 when the movable inner contact member 26 is in the mated position. As will be appreciated below, the movable inner contact member 26 can be supported by the distal end 39 and by the spring 32 so as to be spaced from all other locations of the stationary inner contact member 30.

The movable inner contact member 26 can be cylindrical in shape. Thus, the outer cross-sectional dimension of the movable inner contact member 26 can be a diameter, though it should be appreciated that the movable inner contact member 26 can be alternatively shaped as desired. In some examples, the inner and outer cross-sectional dimensions can be coincident with the central axis 31.

The outer cross-sectional dimension of the movable inner contact member 26 can be sized to contact the inner surface portions 41*a* and 41*b* at the distal end 39 of the arms 40*a* and 40*b*, thereby causing the arms 40*a* and 40*b* to elastically flex radially outward away from each other. The resilience of the arms 40*a* and 40*b* causes the distal end 39 of each of the arms to apply a radially inward spring force against the outer surface 53 of the movable inner contact member 26, thereby maintaining contact between movable inner contact member 26 and each of the arms 40*a* and 40*b* both in the initial position and in the mated position, and at all locations from the initial position to the mated position. Thus, the movable inner contact member 26 and the stationary inner contact member 30 can be in electrical communication with each other with respect to conduction of RF signals.

With continuing reference to FIG. 4A, and as described above, the spring 32 can be configured to bias the inner movable contact member 26 forward to the initial position. In particular, the spring seat 34 can be stationary and supported at a location rearward of the movable inner contact member 26. The spring seat 34 can be disposed in the inner channel 51 of the stationary inner contact portion 30. Thus, the spring seat 34 can be disposed in the channel 52 of the outer housing 22. In one example, the spring seat 34 can be press-fit into the inner channel 51. It should be appreciated, however, that the spring seat 34 can be secured to the stationary inner contact member 30 as desired. Alternatively, the spring seat 34 can be monolithic with the stationary inner contact member 30. For instance, the spring seat 34 can be defined by a partially or entirely closed end of the channel 52. The central axis 31 of the RF electrical contact 20 can be coincident with the central axes of both the movable inner contact member 26 and the spring seat 34.

The spring 32 can extend from the spring seat 34 to the movable inner contact member 26. In particular, the spring 32 can extend forward from a front end of the spring seat 34 to a rear end of the movable inner contact member 26. In one example, the spring 32 can extend into the spring seat 34, and can further extend into the movable inner contact member 26. The spring 32 and the spring seat 34 can be electrically conductive or electrically insulative as desired. The spring 32 can be placed in compression, thereby providing a forward biasing force to the movable inner contact member 26 in the forward direction. The movable inner contact member 26 and the stationary inner contact member 30 can define respective stop surfaces that are configured to abut each other so as to limit the forward movement of the movable inner contact member 26 with respect to the stationary inner contact member 30.

In particular, the movable inner contact member 26 can define a movable flange 56 that projects out from the outer surface 53. The movable flange 56 can define a rear end of the movable inner contact member 26. The stationary contact member 30 can define a stationary flange 58 that extends into the inner channel 51 from the radially inner surface 41. The stationary flange 58 can extend in from the radially inner surface 41 at the base portion 38 in one example. It should be appreciated that the stationary flange 58 can be alternatively located as desired. Respective stop surfaces of the movable and stationary flanges 56 and 58 can be aligned with each other along the longitudinal direction. The stop surface of the movable flange 56 can be a forward-facing surface of the movable flange 56, and the stop surface of the stationary flange 58 can be a rearward-facing surface of the stationary flange 58. When the movable flange 56 and the stationary flange 58 abut each other at their respective stop surfaces, mechanical interference prevents the movable inner contact member 26 from traveling forward under the biasing force of the spring 32. The movable inner contact member 26 is in the initial position when the stop surfaces of the flanges 56 and 58 abut each other. When the movable inner contact member 26 has moved from the initial position toward the mated position, the stop surfaces of the flanges 56 and 58 separate, and the flanges 56 and 58 are no longer in contact with each other.

Figure 6A:
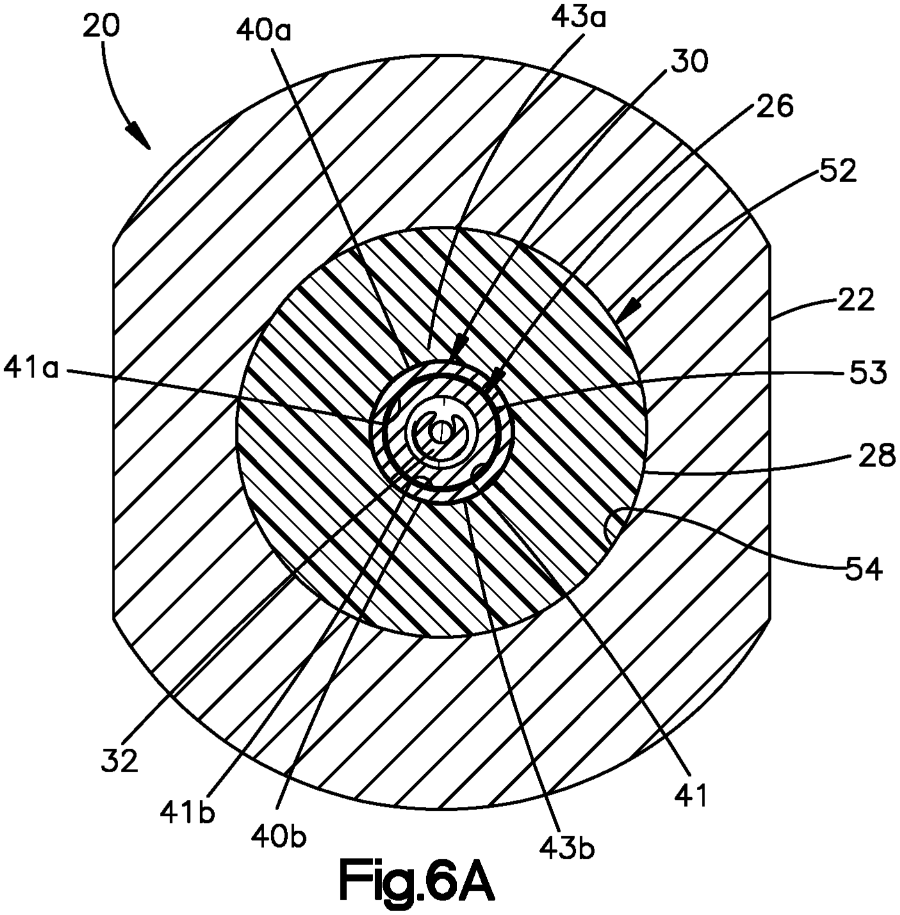
FIG. 6A is a sectional end elevation view of the RF electrical contact illustrated in FIG. 4A, taken along line 6A-6A.
Figure 6B:
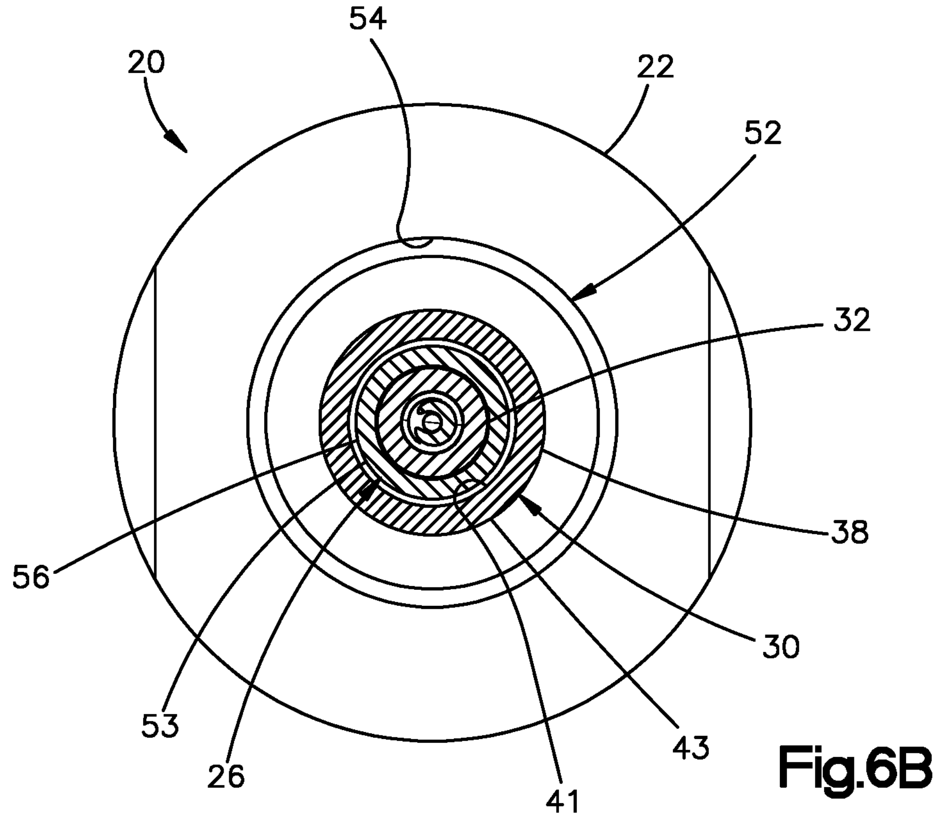
FIG. 6B is a sectional end elevation view of the RF electrical contact illustrated in FIG. 4A, taken along line 6B-6B.

As described above, the inner surface portions 41*a* and 41*b* of the arms 40*a* and 40*b*, respectively, can taper inwardly as they extend in the forward direction from the base portion 38 to the stationary contact location. Thus, the inner surface portions 41*a* and 41*b* can flare radially outward as they extend rearward from the contact location. Accordingly, as illustrated at FIGS. 4A-4B and 6A-6B, the movable and stationary inner contact members 26 and 30 can define a radial gap between the outer surface 53 and the inner surface 41 at all locations of the movable and stationary inner contact members 26 and 30 spaced from the stationary contact member. For instance, as illustrated at FIG. 6A, the stationary inner contact member 30, including each of the inner surface portions 41*a* and 41*b* and the stationary flange 58, at all locations rearward of the stationary contact location can be spaced from the outer surface 53 of the movable inner contact member 26 both when the movable inner contact member 26 is in the initial position and in the mated position, and at all positions between the initial position and the mated position. Further, as illustrated at FIG. 6B, the inner surface 41 of the stationary inner contact member 30 is radially spaced from the movable flange 56 both when the movable inner contact member 26 is in the initial position and in the mated position, and at all positions between the initial position and the mated position.

During operation, referring now to FIG. 4A, the spring 32 can be in compression when the movable flange 56 abuts the stationary flange 58. Otherwise stated, the spring 32 is pretensioned when the movable inner contact member is in the initial position. Thus, the spring 32 is configured to apply a biasing spring force to the movable inner contact member 26 in the forward direction when the movable inner contact member 26 is in the initial position. The spring force can resist movement of the movable inner contact member 26 from the initial position toward the mated position. The inner contact member 26 has a front end 60 that can define the mating end 23 of the RF electrical contact 20. The front end 60 can define a continuous uninterrupted surface along a direction that is perpendicular to the central axis 31 as illustrated in FIG. 4A. Alternatively, the front end 60 can define an annulus that surrounds the central axis 31.

Referring now to FIG. 4B, the mating end 23, and in particular the front end 60, can be placed against the contact pad 50 of the substrate 48 with sufficient force to overcome the spring force of the spring 32 that biases the movable inner contact member 26 toward the initial position. For instance, the RF electrical contact 20 can be supported by a dielectric housing. The housing can be secured to the substrate 48 such that the mating end 23 contacts the electrical contact pad 50, which in turn causes the movable inner contact member 26 to move in the rearward direction against the spring force to the mated position. Thus, the spring force can bias the mating end 23 against the contact pad 50 when the electrical contact 20 is mated with the contact pad 50. In one example, the housing can support a plurality of RF electrical contacts 20 that each mate with respective electrical contact pads of the substrate 48 when the housing is secured to the substrate. The electrical contact 20 can also adapt to conditions of thermal expansion. In particular, thermal expansion can cause the movable inner contact member 26 to move in the rearward direction, thereby maintaining electrical and physical contact between the mating end 23 and the contact pad 50.

As the RF electrical contact 20 is brought toward the substrate 48, contact between the mating end 23 and the substrate 48 causes the movable inner contact member 26 to travel rearward against the force of the spring 32 to the mated position. The movable inner contact member 26 is in the mated position when the RF electrical contact 20 is secured to the substrate 48. The spring 32 applies a force to the movable inner contact member 26 in the forward direction, which biases the movable inner contact member 26, and in particular the mating end 23, against the substrate 48. Thus, the spring 32 can provide a mating force to the movable inner contact member 26 against the substrate 48, and in particular the contact pad 50.

As illustrated at FIGS. 4A-4B, the contact pad 50 can have an outer pad dimension along a direction perpendicular to the central axis 31, and the front end 60 can have an outer contact dimension along the direction perpendicular to the central axis. The outer pad dimension can be greater than the outer contact dimension at the front end 60, thereby ensuring that an entirety of the front end 60 contacts the contact pad 50. In one example, an entirety of the front end 60 can be surrounded by the contact pad 50 in a plane that is oriented perpendicular to the central axis 31 when the front end 60 is mated with the contact pad 50.

In one specific example, the outer cross-sectional dimension defined by the outer surface 53 of the inner movable contact member 26 can taper from approximately 18 mils to approximately 15 mils as it extends in the forward direction to the front end 60. Thus, outer cross-sectional dimension at the front end 60 can be approximately 15 mils. The taper of the outer surface 53 can be defined over any suitable taper length, such as approximately 5 mils. One example of a taper length of the outer surface 53 is illustrated in FIGS. 2C-2D. The outer surface 53 can taper from a first region having a first outer cross-sectional dimension to a second region having a second outer cross-sectional dimension that is less than the first outer cross-sectional dimension. The taper can be a linear taper. The second outer cross-sectional dimension can be disposed forward of the first outer cross-sectional dimension. In one example, the second outer cross-sectional dimension can be approximately five-sixths of the first outer cross-sectional dimension. However, it should be appreciated that the first and second outer cross-sectional dimensions can have any suitable relationship as desired. For instance, the second outer cross-sectional dimension can be within a range from approximately 50 percent to approximately 90 percent of the first outer cross-sectional dimension. Further, the taper length can be any suitable taper length as desired. In one example, the taper length can be greater than the difference between the first outer cross-sectional dimension and the second outer cross-sectional dimension. It has been found that the front end 60 and the contact pad 50 can define an interface having the target impedance. Thus, the electrical contact 20 can be configured to operate at the target impedance. In one example, the taper length can be disposed entirely in the first zone 66 of the outer housing 22. Alternatively, a first portion of the taper length can be disposed in the first zone 66, and a second portion of the taper length can be disposed in the second zone 68. The outer pad dimension of the contact pad 50 can be approximately equal to the first outer cross-sectional dimension in one example. It should be appreciated, of course, that the outer pad dimension can be suitably sized as desired.

The ground mating end 25 (see FIG. 2B) can have an inner cross-sectional dimension as defined by the inner surface 54 of the housing 22. The electrical contact 20 can define a gap that extends in the radial direction from the outer surface 53 at the front end 60 of the movable inner contact member 26 to the inner surface 54 of the outer housing 22. The gap can be at least approximately 5 mils in one example. For instance, the gap can range from approximately 5 mils to approximately 16 mils. Thus, in one example, the inner surface 54 can define an inner cross-sectional dimension that can range from approximately 28 mils to approximately 50 mils, including approximately 28 mils, and including approximately 44 mils. As described herein with other cross-sectional dimensions, the inner cross-sectional dimension of outer housing 22 defined by the inner surface 54 can be a diameter or any suitable alternative dimension. It should be further appreciated that the inner cross-sectional dimension of the outer housing 22 can be alternatively sized as desired. In one example, the substrate 48 can have signal vias that terminate at the contact pads 50 and are spaced from each other a distance from centerline to centerline. The distance can be approximately 50 mils in one example, though the distance can be any suitable distance as desired.

Figure 5A:
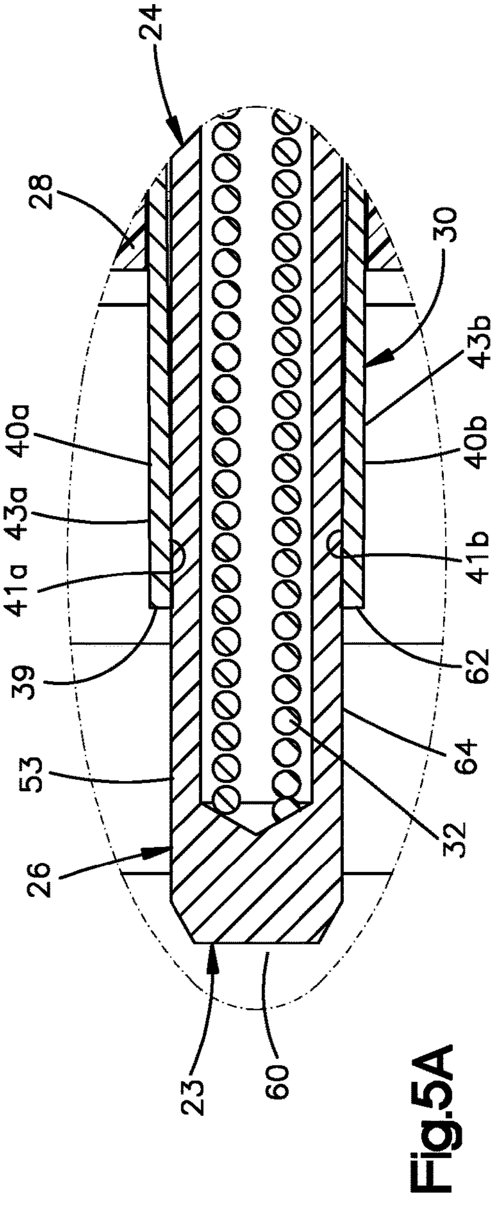
FIG. 5A is an enlarged sectional side elevation view of a portion of the RF electrical contact illustrated in FIG. 4A, showing an interface between the movable inner contact member and the stationary inner contact member.
Figure 5B:
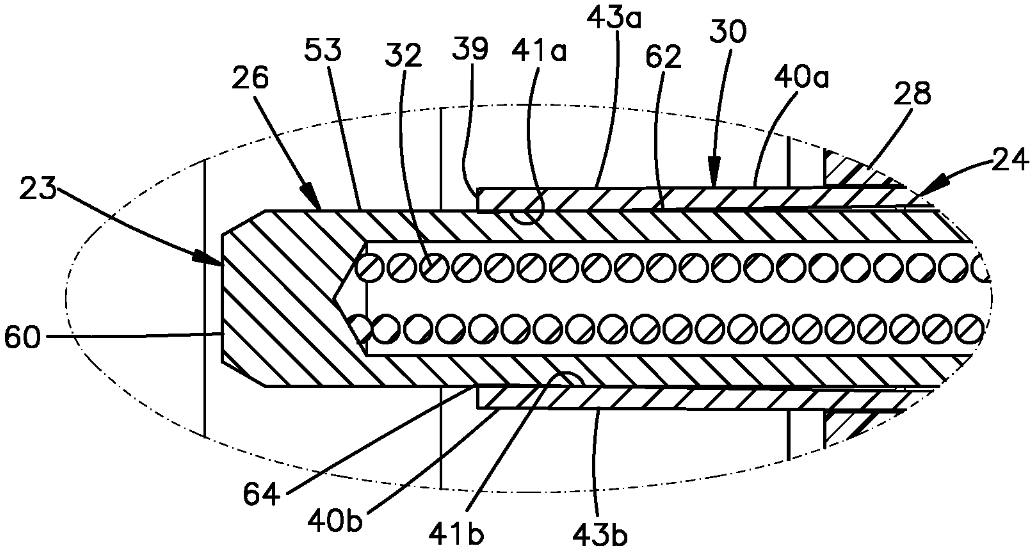
FIG. 5B is an enlarged sectional side elevation view of a portion of the RF electrical contact illustrated in FIG. 4B, showing an interface between the movable inner contact member and the stationary inner contact member.

Referring now to FIGS. 5A-5B, and as described above, the inner movable contact member 26 contacts the stationary contact location of the stationary outer contact member 30 both when the inner movable contact member 26 is in the initial position and the mated position, and at all positions between the initial position and the mated position. The stationary contact location remains positionally constant on the stationary outer contact member 30 both when the inner movable contact member 26 is in the initial position and the mated position, and at all positions between the initial position and the mated position. The movable inner contact member 26 defines a movable contact location that contacts the stationary contact location of the inner stationary contact member 30. The contact location of the movable inner contact member 26 is movable because it moves along the movable inner contact member 26 as the movable inner contact member 26 moves from the initial position to the mated position.

In particular, the movable contact location of the movable inner contact member 26, and in particular the outer surface 53, can define a first location 62 when the movable inner contact member 26 is in the initial position, and a second location 64 when the movable inner contact member 26 is in the mated position. The second location can be spaced from the first location in the forward direction. The movable contact location of the movable inner contact member 26 can extend from the first location to the second location. In this regard, the stationary contact member of the stationary inner contact member 30 can contact the movable inner contact member 26 at the first location 62, at the second location 64, and at all positions between the first location 62 and the second location 64 as the movable inner contact member 26 moves between the initial position and the mated position.

The movable inner contact member 26 can be in contact with the stationary inner contact member 30 only at the stationary contact location of the stationary inner contact member 30 when the movable inner contact member 26 has moved from the initial position toward the mated position. Further, the stationary contact location does not move as the movable inner contact member 26 moves from the initial position to the mated position. Thus, the RF electrical contact can be constructed such that the impedance of the RF electrical contact 20 in the initial configuration can be substantially equal to the impedance of the RF electrical contact 20 in the mated configuration as described above.

For instance, the outer housing 22 can include zones of different radial thicknesses along its length. The length of the outer housing 22 can be oriented along the longitudinal direction. The radial thickness of the outer housing 22 can impact the impedance of the electrical connector, along with the radial thickness of one or more of the movable inner contact member 26, the stationary inner contact member 30, and the electrically insulative spacer 28 at a location in plane with the outer housing 22 along a plane that is oriented perpendicular to the central axis 31.

In one configuration, the radially inner surface 54 of the outer housing 22 can define a first zone 66 having a first inner cross-sectional dimension, and a second zone 68 having a second inner cross-sectional dimension. The second inner cross-sectional dimension can be greater than the first inner cross-sectional dimension. The radially inner surface 54 of the outer housing 22 can define a third zone 70 having a third inner cross-sectional dimension. The third inner cross-sectional dimension can be greater than the second inner cross-sectional dimension. The second inner cross-sectional dimension can be greater than the first inner cross-sectional dimension. The first, second, and third inner cross-sectional dimensions can be diameters in one example, or can be alternatively configured as desired. The first zone 66 can be disposed forward of the second zone 68. For instance, the first zone 66 can extend forward from the second zone 68. The second zone 68 is disposed forward of the third zone 70. For instance, the second zone 68 can extend forward from the third zone 70. Thus, the second zone 68 can extend rearward from the first zone 66 to the third zone 70.

The first zone 66 can define a front end of the outer housing 22 that faces the substrate 48 when the RF electrical contact is mated with the substrate 48. The second zone 68 can be radially aligned with at least a portion of the arms 41*a* and 41*b* of the stationary inner contact member 30. That is, a plane oriented perpendicular to the central axis 31 can extend through the second zone 68 and the arms 41*a* and 41*b*. In particular, the second zone 68 can be radially aligned with the contact location of the stationary inner contact member 30 both when the movable inner contact member 26 is in the initial position and when the movable inner contact member is in the mated position. Otherwise stated, the stationary contact location can be disposed in the second zone of the connector housing 22. That is, the second zone 68 can be radially aligned with the distal end of the first and second arms 41*a* and 41*b*. The third zone 70 can be radially aligned with the electrically insulative spacer 28. Otherwise stated, the electrically insulative spacer can be disposed in the third zone 70 of the connector housing 22. The third zone 70 can further be radially aligned with an entirety of the stationary inner contact member 30. Otherwise stated, an entirety of the stationary inner contact member 30 can be disposed in the third zone 70 of the connector housing 22.

Figure 8:
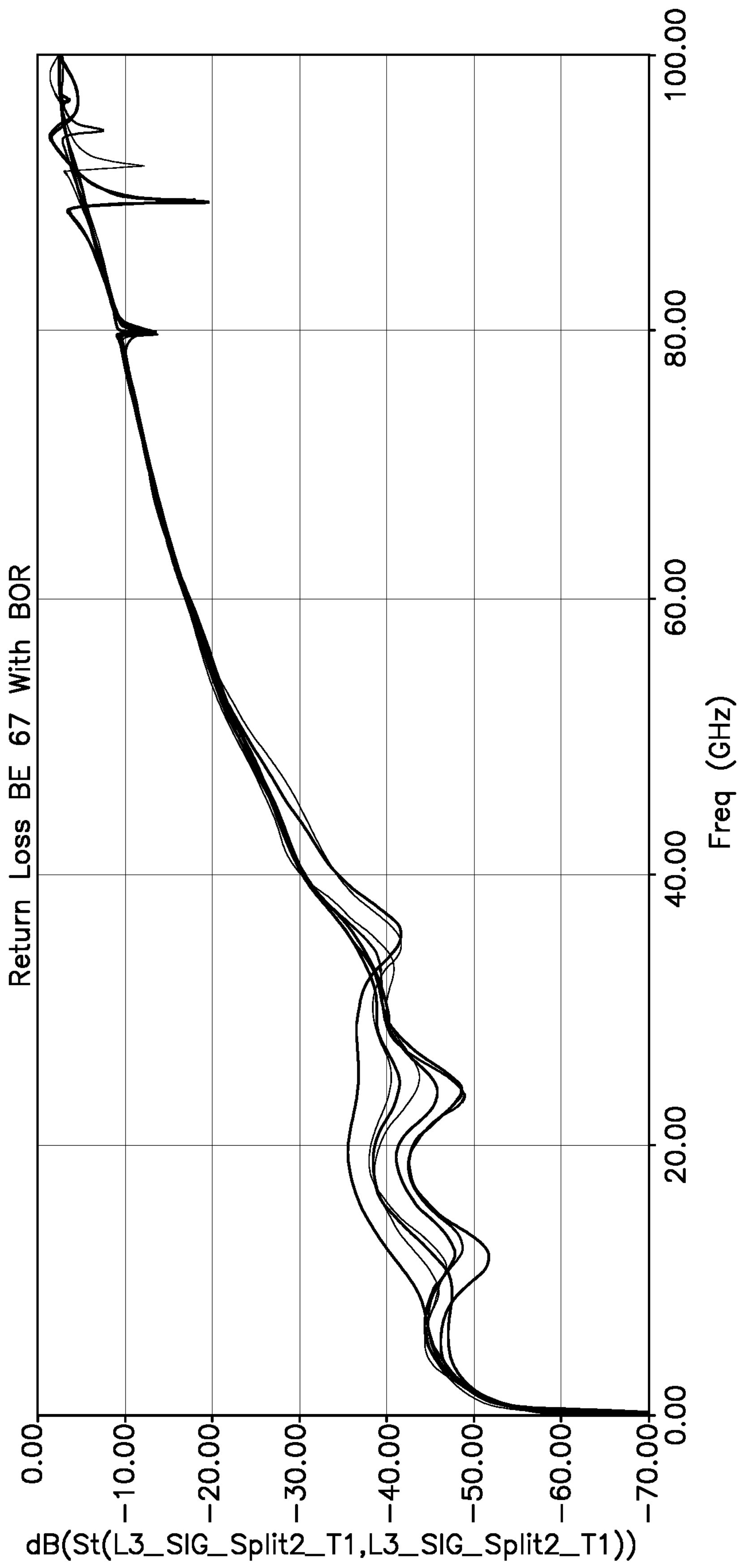
FIG. 8 is a graph that plots differential return loss as a function of operating frequency of the RF electrical contact in accordance with one example.

As described above, the electrical contact 20 can be configured to transfer data at data transfer frequencies up to approximately 72 GHz, including approximately 67 GHz in accordance with one example. Referring to FIG. 8, the electrical contact 20 can transmit data at data transfer frequencies of up to approximately 67 GHz or approximately 72 GHz with a single-ended return less than −5 dB. For instance, the single-ended return loss can be less than −10 dB. In particular, the single-ended return loss can be no greater than −15 dB in some examples. Further, in some examples, the data can be transferred at crosstalk levels less than 6% at the data transfer frequencies.

In one example, as shown at FIGS. 3A and 4A, the outer surface 53 of the movable inner contact member 26 can be substantially cylindrical from the flange 56 to the front end 60. Alternatively, referring now to FIGS. 2C and 2D, the electrical contact 20 can be geometrically configured in any suitable manner as desired. In one example, the outer surface 53 of the movable inner contact member 26 can be tapered as it extends in the forward direction. Thus, the outer surface 53 can define a first region 53*a* having a first outer cross-sectional dimension, and a second region 53*b* having a second outer cross-sectional dimension that is different than the first cross-sectional dimension 53*a*. The second region 53*b* can extend from the first region 53*a* in the forward direction to the front end 60. The second cross-sectional dimension at the front end 60 can be less than the first cross-sectional dimension. The first and second cross-sectional dimensions can be respective maximum cross-sectional dimensions at the first and second regions 53*a* and 53*b*, respectively. In one example, the maximum cross-sectional dimensions can extend through the central axis 31. In some examples, the maximum cross-sectional dimensions can be configured as diameters. For instance, the first region 53*a* can be cylindrical. The second 53*b* region can be frustoconical. It should be appreciated of course that the first and second regions 53*a* and 53*b* can be alternatively shaped as desired.

Referring now to FIGS. 2B-2D, it has been found that if the dimensions at the front end of the electrical contact 20 is reduced by an amount 33% (two-thirds), the cut-off frequency of the electrical contact 20 can be increased by the inverse of the amount, which can equal three-halves or 150%. Thus, the target operating frequency can be 150% of approximately 72 GHz which is approximately 108 GHz in one example.

Thus, in one specific example, the outer cross-sectional dimension defined by the outer surface 53 of the inner movable contact member 26 can taper from approximately 12 mils to approximately 10 mils as it extends in the forward direction to the front end 60. Thus, outer cross-sectional dimension at the front end 60 can be approximately 10 mils. Alternatively, in some examples, the front end 60 can be approximately 8 mils. The taper of the outer surface 53 can be defined over any suitable taper length, such as approximately 5 mils. One example of a taper length of the outer surface 53 is illustrated in FIGS. 2C-2D. The outer surface 53 can taper from the first region 53*a* having the first outer cross-sectional dimension to the second region 53*b* having the second outer cross-sectional dimension that is less than the first outer cross-sectional dimension. The taper can be a linear taper. The second outer cross-sectional dimension can be disposed forward of the first outer cross-sectional dimension. In one example, the second outer cross-sectional dimension can be approximately five-sixths of the first outer cross-sectional dimension. However, it should be appreciated that the first and second outer cross-sectional dimensions can have any suitable relationship as desired. For instance, the second outer cross-sectional dimension can be within a range from approximately 50 percent to approximately 90 percent of the first outer cross-sectional dimension. Further, the taper length can be any suitable taper length as desired. In one example, the taper length can be greater than the difference between the first outer cross-sectional dimension and the second outer cross-sectional dimension. In one example, the taper length can be disposed entirely in the first zone 66 of the outer housing 22. Alternatively, a first portion of the taper length can be disposed in the first zone 66, and a second portion of the taper length can be disposed in the second zone 68. The outer pad dimension of the contact pad 50 can be approximately equal to the first outer cross-sectional dimension in one example. It should be appreciated, of course, that the outer pad dimension can be suitably sized as desired.

As described above, the electrical contact 20 can define a gap that extends in the radial direction from the outer surface 53 at the front end 60 of the movable inner contact member 26 to the inner surface 54 of the outer housing 22. The gap can be at least approximately 5 mils in one example. For instance, the gap can range from approximately 5 mils to approximately 16 mils. Thus, in one example, the inner surface 54 can define an inner cross-sectional dimension that can range from approximately 22 mils to approximately 50 mils, including approximately 22 mils, and including approximately 44 mils. In one example, the substrate 48 can have signal vias that terminate at the contact pads 50 and are spaced from each other a distance from centerline to centerline. The distance can be sized such that a plurality of the electrical contacts 20 can be mated with a respective plurality of the contact pads 50 while maintaining electrical isolation from each other. In one example, the contact pads 50 are placed as close together as possible while maintaining electrical isolation between the adjacent electrical contacts 20.

It is recognized that the electrical contact 20 can be implemented in any suitable application as desired. In one example, the electrical contacts 20 can be implemented in a chip testing system. For instance, one or more electrical contact 20 can be mated to a substrate that defines a test board for integrated circuits, or chips. The electrical contacts can be mated to any suitable measuring device for the purposes of measuring operating characteristics and parameters of the chips, such as signal outputs of the chips, as desired. The electrical contacts 20 can further be implemented in cellular transmission towers to conduct radio frequencies at a desired speed.

It should be appreciated that the illustrations and discussions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should be further appreciated that the various alternative embodiments described above with respect to one illustrated embodiment can apply to all embodiments as described herein, unless otherwise indicated.

What is claimed:

1. An electrical contact comprising:

a stationary electrical contact member; and a movable electrical contact member that is movable with respect to the stationary electrical contact member from an initial position to a mated position, wherein a tapered inner surface of the stationary electrical contact member defines a contact location that is in contact with the movable electrical contact member both in the initial position and the mated position, wherein the electrical contact is configured to conduct RF signals within 10 percent of a target impedance both when the movable electrical contact member is in the initial position and when the movable electrical contact member is in the mated position.

2. The electrical contact as recited in claim 1, wherein the target impedance is 50 Ω.

3. The electrical contact as recited in claim 1, wherein the electrical contact is configured to conduct RF signals within 3Ω of the target impedance.

4. The electrical contact as recited in claim 1, wherein the electrical contact is configured to conduct RF signals within 1Ω of the target impedance.

5. The electrical contact as recited in claim 1, wherein the movable electrical contact member contacts a contact location of the stationary electrical contact member as the movable electrical contact member moves from the initial position to the mated position, and the contact location of the stationary electrical contact member is stationary as the movable electrical contact member moves from the initial position to the mated position.

6. The electrical contact as recited in claim 5, further comprises an electrically conductive outer housing that is electrically isolated from each of the movable and stationary electrical contact members.

7. The electrical contact as recited in claim 6, wherein the electrically conductive housing defines a first zone having a first inner cross-sectional dimension, and a second zone having a second inner cross-sectional dimension that is greater than the first inner cross-sectional dimension.

8. The electrical contact as recited in claim 7, wherein the second zone is aligned with a distal free end of the stationary electrical contact member.

9. The electrical contact as recited in claim 6, wherein the contact defines a gap that extends from the movable inner contact member to the outer housing, and the gap is at least approximately 5 mils.

10. The electrical contact as recited in claim 7, further comprising an electrically insulative spacer that extends from the stationary electrical contact member to the outer housing.

11. The electrical contact as recited in claim 1, wherein the movable electrical contact member has an outer surface that is in contact with the stationary electrical contact member both in the initial position and the mated position, and at all positions between the initial position and the mated position.

12. The electrical contact as recited in claim 11, wherein the outer surface of the movable inner contact member is tapered from a first region to a front end that is configured to mate with an electrical contact pad of a substrate.

13. The electrical contact as recited in claim 12, wherein the outer surface of the movable inner contact member tapers from a first cross-sectional dimension to a second cross-sectional dimension that ranges from 50 percent to 90 percent of the first cross-sectional dimension.

14. The electrical contact as recited in claim 13, wherein the second cross-sectional dimension is approximately five-sixths of the first cross-sectional dimension.

15. The electrical contact as recited in claim 1, wherein the movable electrical contact member is biased toward the initial position.

16. The electrical contact as recited in claim 1, wherein the stationary electrical contact member comprises at least one arm that defines a distal end of the stationary electrical contact member, and the movable electrical contact member is in contact with the distal end both in the initial position and the mated position, and at all positions between the initial position and the mated position.

17. The electrical contact as recited in claim 16, wherein the at least one arm of the stationary electrical contact member comprises first and second cantilevered arms.

18. The electrical contact as recited in claim 17, wherein each of the first and second cantilevered arms are resilient and deflected outward, and apply an inward spring force against the movable electrical contact member.

19. The electrical contact as recited in claim 1, wherein the electrical contact is an RF electrical contact.

20. The electrical contact as recited in claim 1, wherein the electrical contact transmits RF signals through approximately 67 GHz.

21. The electrical contact as recited in claim 1, wherein the electrical contact transmits RF signals through approximately 72 GHz.

22. The electrical contact as recited in claim 1, wherein the electrical contact transmits RF signals through approximately 108 GHz.

23. The electrical contact as recited in claim 1, wherein the movable electrical contact member defines a first mating end, the electrical contact is elongate along a central axis, and the electrical contact further comprises a ground contact member that defines a second mating end that at least partially surrounds the first mating end in a plane that is oriented substantially perpendicular to the central axis.

24. The electrical contact as recited in claim 23, wherein the second mating end extends about an entirety of the first mating end in the plane.

25. An array of electrical contacts, comprising:

an array housing; and the electrical contact as recited in claim 24 supported by the array housing, wherein the array housing includes an internal surface that defines a recess that surrounds an entirety of the second mating end.

26. The array of electrical contacts as recited in claim 25, wherein the array housing is electrically conductive.

27. The electrical contact as recited in claim 25, wherein the second mating end extends about a portion less than an entirety of the first mating end in the plane.

28. An array of electrical contacts, comprising:

an array housing; and the electrical contact as recited in claim 24 supported by the array housing, wherein the array housing includes an internal surface that defines a recess that partially surrounds the second mating end, wherein the internal surface further defines a channel that extends from the recess toward an outer perimeter of the array housing.

29. The array of electrical contacts as recited in claim 28, wherein the channel extends from the recess to the outer perimeter of the array housing.

30. The array of electrical contacts as recited in claim 28, wherein the array housing is electrically conductive.

* * * * *